Sept. 29, 1936.                H. A. DINGELDEIN                 2,055,523
REVERSING AND CHANGE SPEED MECHANISM FOR METALWORKING MACHINERY
               Original Filed Dec. 15, 1933    2 Sheets-Sheet 1

INVENTOR,
Harry A. Dingeldein.
BY Howard P. Smith
His ATTORNEY

Sept. 29, 1936. H. A. DINGELDEIN 2,055,523
REVERSING AND CHANGE SPEED MECHANISM FOR METALWORKING MACHINERY
Original Filed Dec. 15, 1933 2 Sheets-Sheet 2

INVENTOR,
Harry A. Dingeldein
By Howard S. Smith
his ATTORNEY

Patented Sept. 29, 1936

2,055,523

UNITED STATES PATENT OFFICE 2,055,523

REVERSING AND CHANGE SPEED MECHANISM FOR METALWORKING MACHINERY

Harry A. Dingeldein, Hamilton, Ohio, assignor to The Liberty Machine Tool Company, Hamilton, Ohio, a corporation of Ohio Application December 15, 1933, Serial No. 702,554
Renewed August 8, 1936

1 Claim. (Cl. 74—342)

This invention relates to new and useful improvements in reversing and change speed mechanism for metal working machinery, and more particularly for planers.

It is one of the principal objects of my invention to provide for metal working machinery such as planers, a fast reversing and change-speed mechanism which will materially increase the productive efficiency of the machine and at the same time promote a substantial saving in respect to floor space and manufacturing costs. A non-reversible A. C. or D. C. motor, with single or variable speed characteristics, can be used in a smaller size for the same rate of horsepower to save power costs.

In my new drive a gear box including a clutch preferably of the multiple disc type, may be bolted to or mounted separately from the planer. No overhead belts or drives are needed, there is no loss through slippage when, for instance, belts are moved from a loose to a tight pulley, thus insuring safety to machine and operator. The elimination of shut down time for repairing broken belts, worn-out pulleys and bushings is also achieved by my device.

It is another object of the invention to provide for metal working machinery such as planers, manual or automatic operating means that promote faster production, reduce the force required to shift belts and eliminates vibration.

Other important and incidental objects will be brought out in the following specification and particularly set forth in the subjoined claim.

Figure 1:
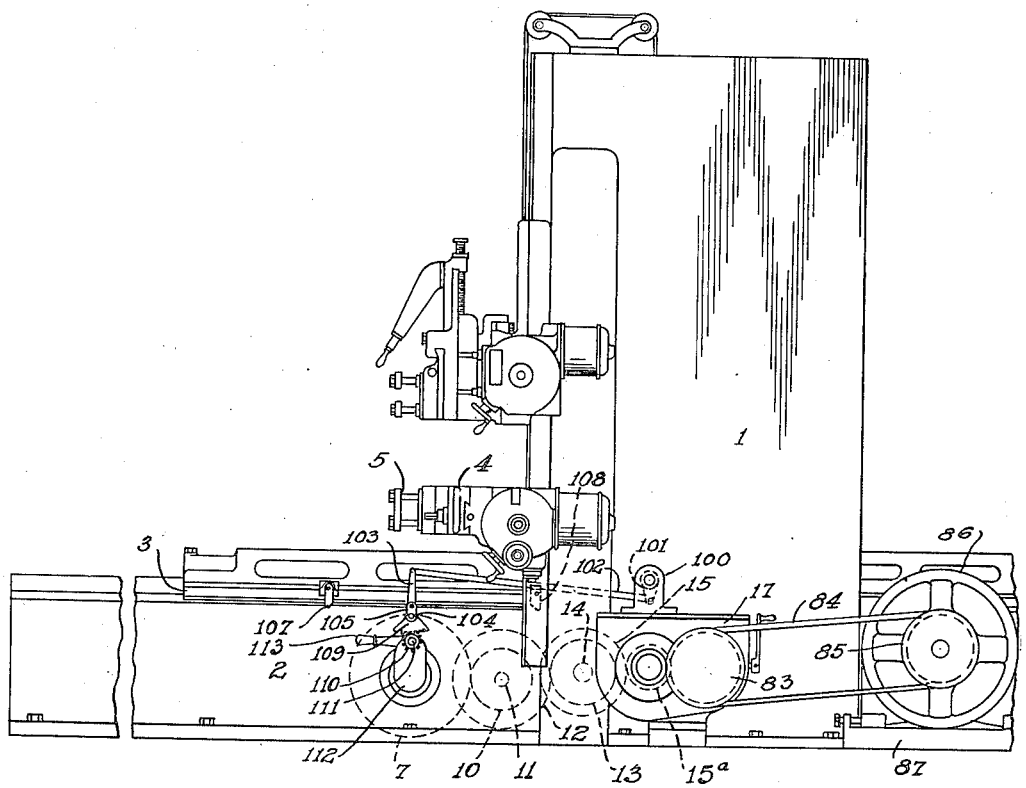
Figure 2:
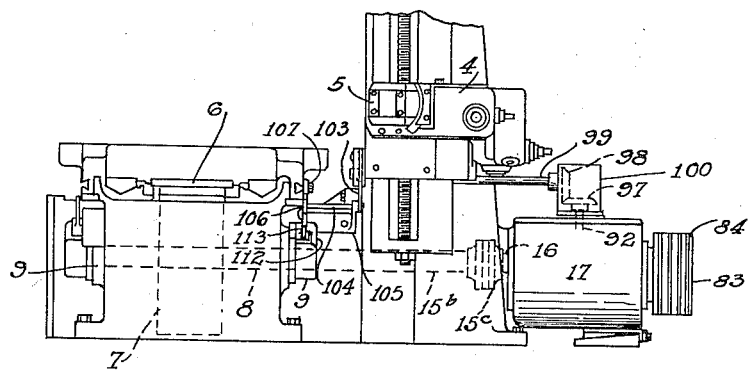
Figures 3, 4:
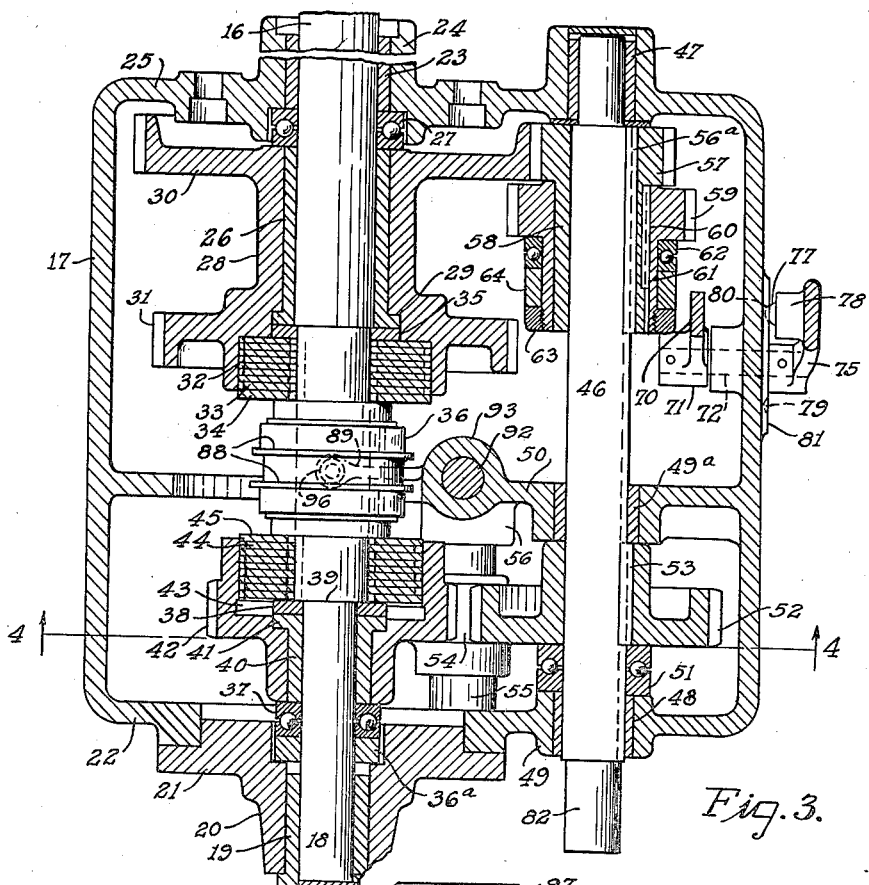

In the accompanying drawings, Figure 1 is a side elevational view of a planer to which my reversing and change-speed mechanism is applied. Figure 2 is a rear end view of the same. Figure 3 is a longitudinal sectional view taken through the reversing and change-speed gear box. And Figure 4 is a cross sectional view taken through said gear box on the line 4—4 of Figure 3.

Referring to the accompanying drawings for a detailed description of the form of embodiment of my invention, illustrated therein, the numeral 1 designates a planer having a bed 2, platen 3, and cross slide 4, tool holder 5, and conventional devices for adjusting the position of the tool and cutter.

The platen 3 is provided with a rack 6 on its undersurface for engagement with a gear 7 mounted on a shaft 8. The latter, which is journaled in bearings 9, 9 in the bed 2, meshes with a pinion 10 mounted on a shaft 11 which carries a gear 12. The latter is in engagement with a pinion 13 mounted on a shaft 14 which carries a gear 15. This gear is in mesh with a pinion 15$^a$ fixedly secured to a shaft 15$^b$ that is connected by a coupling 15$^c$ to a main shaft 16 in a housing 17. (See Figures 1 and 2.)

The small end 18 of the main shaft 16 revolves in a plain bearing 19 in the hollow boss portion 20 of a removable cap plate 21 secured in a circular opening in the side 22 of the gear box. The large end of this main shaft is journaled in a similar bearing 23 in a hollow boss 24 on the other side 25 of the gear box, directly opposite the removable bearing plate 21. (See Figure 3.)

Between the bearing 23, and a sleeve bearing 26 on the large end of the main shaft 16, is a ball thrust bearing 27. Free to rotate around the sleeve bearing 26 is the elongated hub 28 of a double gear whose inward axial movement is limited by a shoulder 29 on the sleeve bearing 26.

The double gear 26 comprises a large gear 30 and a small gear 31, the latter being formed in its face portion with an annular recess 32 to receive a plurality of clutch discs 33 and 34 that surround a slightly reduced portion of the main shaft 16 between a steel washer 35 and a sliding collar 36 thereon. The smaller clutch discs 33 are keyed to the main shaft, while the conventional radial projections on the larger discs fit in slots to receive them in the wall that defines the recess 32 in the small gear 31.

Surrounding the small end 18 of the main shaft 16 within the removable side plate 21, is a steel washer 36$^a$ that is in contact with a ball thrust bearing 37. Between the latter and a steel washer 38 which abuts against a shoulder 39 on the main shaft 16, a sleeve bearing 40 formed with a flange 41 surrounds the shaft 16.

Free to rotate around the sleeve bearing 40 is a gear 42 formed in its face portion with an annular recess 43 to receive the steel washer 38 and a plurality of clutch discs 44 and 45 that surround the main shaft 16 between the sliding collar 36 and the steel washer 38. The smaller clutch discs 44 are keyed to the shaft 16, while the conventional radial projections on the larger discs 45 fit in slots to receive them in the wall of the gear that defines the recess 43.

These clutch discs 44 and 45 may be engaged by the sliding collar 36 to cause the gear 42 to rotate the main shaft 16, or the clutch discs 33 and 34 may be engaged by that collar to cause the double gear 28 to revolve that shaft.

Parallel with the main shaft 16 is a drive shaft 46 which rotates at one end in a bearing 47 mounted in a boss on the side 25 of the gear box, while its other end is journaled in a bearing 48 mounted in the hollow reinforced portion 49 of the end wall 22 of said gear box. The shaft 46 is journaled at its middle portion in a bearing 49a within a circular opening in a partition 50 in the gear box. Surrounding the shaft 46, and in engagement with the enlarged portion 49 of the end wall 22, is a ball thrust bearing 51 which is engaged by a gear 52 secured to the shaft 46 by a key 53.

The gear 52 is in mesh with an idler gear 54 mounted on a shaft 55 below, and approximately midway between, the shafts 16 and 46. The shaft 55 is journaled at one end in a boss 56 on the partition 50 in the gear box, and at its other end suitably journaled in the end wall 22 of said gear box. The idler gear 54 is also in mesh with the gear 42 on the small portion 18 of the main shaft 16, whereby the latter shaft may be rotated in a reverse direction by the drive shaft 46 when the clutch discs 44 and 45 are engaged by the sliding collar 36.

Secured to the other end of the drive shaft 46 by a key 56a, for a sliding movement thereon, is a gear 57 having an elongated hub portion 58. This gear 57 is adapted to mesh with the large gear 30 on the main shaft 16, while a gear 59, of larger diameter than the gear 57 and mounted on its hub portion, is adapted to mesh with the small gear 31 on said main shaft 16. The gear 59 is secured within a shouldered recess in the hub 58 of the gear 57, by a key 60.

Surrounding an elongated hub 61 of the gear 59 in a position to engage the inner face of that gear, is a thrust bearing 62. The inner end of the gear hub 61 is externally threaded to receive an end nut 63 between which and the thrust bearing 62 a slider ring 64 is mounted on said hub.

Projecting upwardly from the ring 64 is a reinforced extension 65 that terminates in a sleeve 65a which is slidable on a rod 66 mounted in the gear box parallel with the shaft 46. Projecting outwardly from the sleeve 65a is a boss 67 having a reduced extension 68 that is engaged by the forked end 69 of an arm 70. The lower end of the arm 70 terminates in a hollow boss portion 71 which is tightly fitted on the end of a stub shaft 72, which is free to rotate in a hollow boss 73 on the inner lower portion of a side wall 74 of the gear box.

Fixedly secured to the outer end of the stub shaft 62, beyond the gear box side wall 74, is the lower end of a crank handle 75 carrying on its upper end a hand grip portion 76. By means of this crank 75 and the slider mechanism before described, the gears 57 and 59 may be slid along the shaft 46, to bring either the small gear 57 in mesh with the large gear 30 on the main shaft 16, or the large gear 59 into engagement with the small gear 31 on said main shaft, thereby providing a change-speed direct drive from the shaft 46 to the shaft 16. While I provide for two speeds in this instance, a larger number is within the scope of the invention.

The crank 75 may be held in either one of its extreme gear-engaging positions by a ball 77 in a boss 78 on its lower middle portion, that is spring-pressed into a corresponding recess 79 or 80 in a plate 81 secured to the side wall 74 of the gear box.

Secured to the outer end 82 of the drive shaft 46 is a pulley 83 which receives a plurality of belts 84 that pass around a pulley 85 on the armature shaft of an electric motor 86 mounted on a base 87 adjacent the gear box 17. This motor may be a single or variable speed one of the A. C. or D. C. type.

The clutch may be automatically operated to reverse the movement of the platen 3 by the following means. In the first place the sliding collar 36 has formed on the middle portion of its periphery, two spaced flanges 88, 88. Straddling the collar 36 are the ends 89, 89 of a yoke 90 which is secured by a pin 91 to a shaft 92 mounted in a hollow boss portion 93 on the partition 50 of the gear box and projecting through a hole in a cover plate 94 on the latter. (See Figures 3 and 4.) Projecting radially inwardly from each end 89 of the yoke 90 is a pin 95 carrying a roller 96 which engages the collar 36 between the flanges 88, 88 thereon, to shift the collar laterally a sufficient distance to engage either clutch with its respective gear on the main shaft 16 when the shaft 92 is rotated by the following means.

Fixedly secured on the outer end of the shaft 92 is a bevel gear 97 that is in mesh with a bevel gear 98 fixedly secured to a horizontal shaft 99 that is journaled in suitable bearings in the planer. Secured to the cover 94 of the gear box 17 is a casing 100 which houses the gears 97 and 98. (See Figures 1 and 2.)

Fixedly secured to the outer portion of the shaft 99 is a crank arm 101 to whose outer end there is pivotally connected one end of a link 102, to whose outer end there is pivotally secured the upper end of a lever arm 103. At its lower end the lever arm 103 is attached to a shaft 104 journaled in a bracket 105 secured to the bed 2 of the planer.

Also secured to the shaft 104 is a short arm 106 that is in the path of longitudinal movement of two adjustable dogs 107 and 108, carried by the platen 3. These dogs are secured to said platen a sufficient distance apart so that when the platen approaches the end of its inward movement, the dog 107 will engage the arm 106, and the dog 108 will engage the arm 106 when the platen approaches the end of its outward movement.

When the dog 107, for example, engages the offset arm 106 on the shaft 104, it will cause the shaft 92 to be rotated by the mechanism heretofore described to cause the yoke 90 to shift the collar 36 toward the clutch discs 44 and 45, to effect an inter-engagement of these discs.

When this clutch is engaged, the shaft 16 will be turned in a reverse direction by the gear 42, idler gear 54, and gear 52 on the drive shaft 46. Since the platen is moved over the bed 2 by the shaft 16 through the gears hereinbefore described, its movement will be reversed when the direction of rotation of the shaft 16 is reversed through the engagement of the dog 107 with the offset arm 106.

When the dog 108 engages the offset arm 106 near the end of the outward movement of the platen, the collar 36 will be shifted in the reverse direction by the yoke 91 to engage the clutch discs 33 and 34 for the purpose of causing a direct drive from the shaft 46 through the gears that are in mesh between said shaft and the main shaft 16. If the gear shift handle 75 is actuated to bring the gear 57 in mesh with the large gear 30 on the shaft 16, the latter will be driven at a lower rate of speed than when the gear 59 on the drive shaft 46 is brought into engagement with the small gear 31 on the main shaft 16.

Thus, it is seen that not only will the movement of the platen be automatically reversed at the end of its rearward and forward movements, but that it may be driven at two different speeds by reason of the change speed gears on the drive shaft 46 and the main shaft 16.

It is also seen that when my reversing and change-speed mechanism is employed in connection with a metal working machine, such as a planer, the movement of the platen may be instantly reversed without the necessity of moving belts from a loose to a tight pulley, thereby insuring safety to the machine and the operator, as well as eliminating the line shaft or motor mounting on the machine.

A saving in floor space, power and manufacturing costs is also promoted, as well as the elimination of vibration. Materially increased production in the amount of planing is further achieved when my reversing and change speed mechanism is employed. The elimination of shut down time for repairing broken belts, worn out pulleys, bushings, and other parts, is also accomplished.

My improved clutch drive may also be manually controlled through the provision of the following means, although other means may be employed for this purpose, if desired.

Referring to Figures 1 and 2, there is secured to the shaft 104 a toothed quadrant 109. The latter is in mesh with a pinion 110 secured to a stub shaft 111 journaled in a bracket 112 attached to the bed 2 of the planer. Also fixedly secured to the shaft 111 is a handle 113 by which the quadrant 109 may be turned to rotate the shaft 104, for the purpose of shifting the clutch yoke 91 as effectively as it is automatically shifted by the engagement of the dog 107 or the dog 108 with the offset arm 106 that is attached to said shaft. By these means, it is possible to manually control the shifting of the clutch if automatic operation is not desired.

I do not desire to be limited to the details of construction and arrangement herein shown and described, since any changes or modifications may be made therein within the scope of the subjoined claim.

Having described my invention, I claim:

A reversing and change speed mechanism comprising a gear box, a main shaft rotatable in said gear box, a double change-speed gear loosely mounted on said shaft, a multiple disc clutch for connecting the double gear with the main shaft, a second gear loosely mounted on said main shaft, a second multiple disc clutch for connecting the second gear with said shaft, a shifting collar on said shaft between the clutches, a drive shaft, a change-speed double gear on the drive shaft for engagement with the double gear on the main shaft, a second gear on the drive shaft, an idler reversing gear in engagement with the second gear on the main shaft and the second gear on the drive shaft, means for shifting the double gear on the drive shaft to bring one or the other of its gears into engagement with a respective gear portion of the double gear on the main shaft, and automatic means for shifting the clutch collar to engage a clutch on the main shaft with its respective gear.

HARRY A. DINGELDEIN.